G. H. DAY.
OPHTHALMIC MOUNTING.
APPLICATION FILED AUG. 9, 1917.
1,291,433.
Patented Jan. 14, 1919.
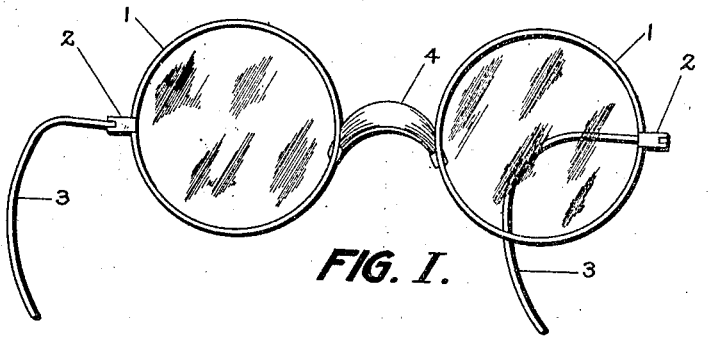
FIG. I.
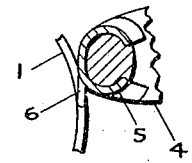
FIG. IV.
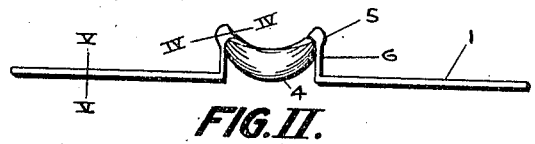
FIG. II.
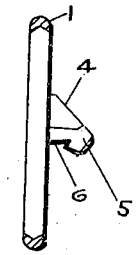
FIG. V.
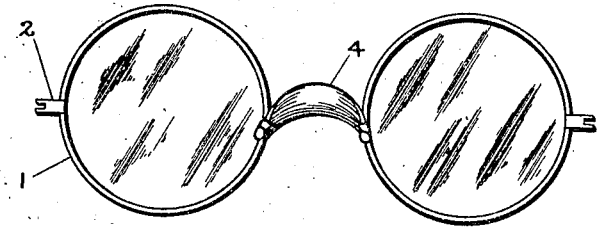
FIG. III.
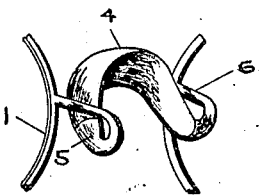
FIG. VIII.
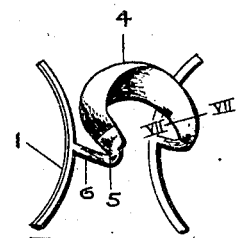
FIG. VI.
FIG. VII.
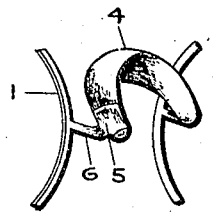
FIG. IX.
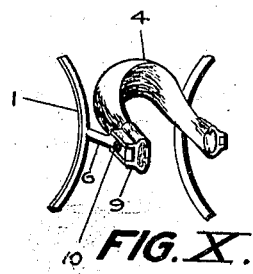
FIG. X.
FIG. XI.
INVENTOR
GEORGE H. DAY
BY
H. H. Styll & H. K. Parsons
ATTORNEYS.

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,291,433.  Specification of Letters Patent.  Patented Jan. 14, 1919.

Application filed August 9, 1917. Serial No. 185,273.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to an improved form of spectacle construction.

One of the leading objects of the present invention is the provision of a novel and improved construction of spectacle particularly adapted for persons having sensitive noses which will present an extremely wide and comfortable bearing portion to the nose of the wearer, and thus increase the comfort of the mounting.

A further object of the present invention is the provision of improved construction of ophthalmic mountings in which the bridge or nose engaging portion shall be of non-metallic and the remainder of the mounting of metallic material.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvement.

Fig. II represents a plan view thereof.

Fig. III represents a rear view of the construction.

Fig. IV represents a sectional view taken as on the line IV—IV of Fig. II.

Fig. V represents a sectional view on the line V—V of Fig. II, looking in the direction of the bridge.

Fig. VI represents a sectional view of a slightly modified construction.

Fig. VII represents a sectional view taken as on the line VII—VII of Fig. VI.

Fig. VIII represents a perspective view of another form of construction.

Fig. IX represents a perspective view of a further modification.

Fig. X represents a similar view illustrating a construction in which various sizes of bridges may be interchangeably used in connection with a single style of lens.

Fig. XI represents a perspective view of one type of connection between the bridge and frame.

In the drawings, the numeral 1 is employed to denote the usual eye wires or lens frames having the lugs 2 for the temples 3 adapted to retain the mounting in position on the face of the wearer. Disposed centrally of the mounting and between the pair of lens rims or frames 1 is my improved wide non-metallic shell or composition center or nose engaging member 4, having embedded in each end the embracing clips 5, from which an arm 6 extends forwardly and is attached to the lens frames.

By reference to the drawings it will be noted that this arm 6 is of relatively thin pliable metal permitting of ready adjustment of the frames to vary the pupillary distance of the mounting as desired, or capable of twisting to raise or lower the bridge, or of looping or slightly bending by suitable pliers to slightly inset or outset the lenses as may be desired.

It will thus be noted that I have provided an improved composition center, light in weight but wide to satisfactorily and comfortably engage the nose of the wearer, and in connection with said wide substantially rigid bridging member have provided long pliable arms extending from the lens frames to the bridge member to permit of any desired fitting of the mounting relative to the face of the wearer, and that consequently I have provided a construction embodying all the comfortable qualities of a shell or other non-metallic mounting and at the same time all the adjustable possibilities present heretofore only in connection with all metal mountings, and that I have consequently provided an extremely efficient and desirable mounting entirely new in the art.

It will further be noted that the arm 6 may be in different forms or shapes as desired and may either be a straight arm extending direct to the point of connection as illustrated in Figs. II and V, for example, may be reversely looped as shown in Fig. VI, or may be looped downwardly and then upwardly as shown in Fig. VIII as desired and may have either the clamp around and slightly embedded in the material of the bridge as shown in Fig. IV, for example, or may have the prongs adapted to extend into the side of the bridging members so that no metal whatever comes into contact with or near the nose of the wearer, or may have both the prongs 7 and also a supplemental locking stud 8, as shown in Fig. XI, also that the arm 6 may be either soldered direct to the clip members 5 or the clip member may, as shown in Fig. X, have the projecting flanges 9, forming a socket to receive the end of the arm 6, which arm may then be fastened in place as by a screw 10. This construction is particularly advantageous when it is desired to carry a stock of the lens frames made up with arms and to then apply to said frames the particular width of bridge necessary for the requirements of the individual wearer.

I claim:

1. In a device of the character described, the combination with a wide nose engaging member, of clips embracing the ends of the member and having portions embedded therein to make a secure joint therewith, pliable metallic arms extending forwardly from said clips, and lens engaging members carried by said forwardly extending arms.

2. In a device of the character described, the combination with a bridge member, of heavy non-metallic material shaped to fit the nose of the wearer, of clips embracing and embedded into the ends of the bridge member, and elongated pliable arms extending diagonally forwardly from the clips and bearing lens attachments, the angle of the clip arms being such that the crest of the bridge will be suitably angled to fit the nose when the lenses are in desired position before the nose of the wearer, substantially as illustrated.

3. The combination with a pair of lens frames, of pliable arms extending rearwardly from said frames, a non-metallic bridge member and means for connecting the non-metallic bridge and the said pliable arms, said means including clips secured to the arms and having portions fitting around and portions embedded within the termini of the bridge member to securely connect the parts substantially as illustrated.

4. The combination with a pair of lens engaging members, of pliable arms extending from the members, and a non-metallic bridging member having its termini secured to said arms.

In testimony whereof I have affixed my signature, in presence of two witnesses.

GEORGE H. DAY.

Witnesses:
J. JOSEPH MACCARTHY,
E. M. LAFLER.